Oct. 31, 1967 W. S. PERCIVAL ET AL 3,350,512

SOUND RECORDING AND TRANSMISSION SYSTEMS UTILIZING COMPANSION FOR NOISE ELIMINATION

Filed June 4, 1963

4 Sheets-Sheet 1

Oct. 31, 1967 W. S. PERCIVAL ET AL 3,350,512

SOUND RECORDING AND TRANSMISSION SYSTEMS UTILIZING COMPANSION FOR NOISE ELIMINATION

Filed June 4, 1963 4 Sheets-Sheet 2

Oct. 31, 1967 W. S. PERCIVAL ET AL 3,350,512

SOUND RECORDING AND TRANSMISSION SYSTEMS UTILIZING COMPANSION FOR NOISE ELIMINATION

Filed June 4, 1963 4 Sheets-Sheet 3

United States Patent Office 3,350,512
Patented Oct. 31, 1967

3,350,512

SOUND RECORDING AND TRANSMISSION SYSTEMS UTILIZING COMPANSION FOR NOISE ELIMINATION

William Spencer Percival, London, and Edward George Trendell, Beaconsfield, England, assignors to Electric & Musical Industries Limited, Middlesex, England, a company of Great Britain Filed June 4, 1963, Ser. No. 285,334
Claims priority, application Great Britain, June 7, 1962, 22,179/62
29 Claims. (Cl. 179—100.2)

ABSTRACT OF THE DISCLOSURE

In a system through which a signal, such as an audio signal, is passed and which contains an element having a relatively high background noise factor, such as an intermediate record on tape or disc or a transmission path over wire or radio, the signal band is divided into upper and lower bands of frequency and those signals in the upper frequency band are compressed prior to application of the recombined signals to the noisy element. After passing through the noisy element the signal is again divided into upper and lower bands of frequencies and the signals in the upper frequency band are expanded and recombined to form an output similar to the system input, wherein the improvement consists in making the band separation frequency prior to expansion differ from the band separation frequency prior to compression in order to reduce the distortion in the overall frequency-amplitude response which would occur if the frequencies were the same.

This invention relates to sound recording and transmission systems.

It has previously been proposed to produce compression of a sound signal before recording such signal in a sound record, for example a magnetic tape record, or before transmitting it for example by way of land line, the signals being expanded on reproduction or reception. The object of such compression followed by expansion is to reduce the undesired effect of noise arising from the record or from the transmisison channel.

However it has been found experimentally that although the effect of noise can be reduced, other disturbances of the signal tend to vitiate the improvement as regards noise. In particular, the use of compression and expansion tends to cause a "rushing" sound during some high level signals.

The object of the present invention is to provide an improved sound recording or transmitting system with a view to enabling compression and/or expansion to be employed with reduced liability to disturbances such as are referred to above.

In accordance with the present invention there is provided in a sound recording or signal transmission system apparatus comprising first filter means for separating the components of an initial signal into first low and high frequency bands, means for compressing the components in one of said bands to a greater degree than the components in the other band, means for combining the components in said one band after compression with the components in said other band, to produce an intermediate signal, means for receiving said intermediate signal after transfer liable to contribute noise to said intermediate signals, second filter means for separating the components of the intermediate signal received by said receiving means into second high and low frequency bands, means for expanding components in said second frequency bands to a degree related to the compression of corresponding components in said first frequency bands, and means for combining the components in said second bands after expansion to produce an output signal substantially corresponding to said input signal, the cross-over frequency of said second low and high frequency bands differing from the cross-over frequency of said first low and high frequency bands to produce a substantially flat overall amplitude response throughout the cross-over region of said filter means for at least one substantial value of relative compression and corresponding subsequent expansion of said one band relative to said other band.

In accordance with one aspect of the present invention there is provided in a sound recording or signal transmission system, apparatus comprising a source of initial electric signal $a$, first filter means for separating said signal into low and high frequency components substantially represented by $a(1-F_1)$ and $aF_1$ respectively, where $F_1$ is a high pass filter response, compression means for multiplying the components $aF_1$ by a factor $q_1$ which is dependent upon the envelope of the component $aF_1$ so as to compress said components $aF_1$, means for combining the low frequency components with said compressed high frequency components to produce an intermediate signal $a'$ represented by $a(1-F_1+q_1F_1)$, means for receiving said intermediate signal after transfer liable to contribute noise to said intermediate signal, second filter means for separating the signal $a'$ received by said receiving means into low and high frequency components substantially represented by $a'(1-F_2)$ and $a'F_2$ respectively, where $F_2$ is a second high pass filter response having a lower cut-off frequency than the response $F_1$, expansion means for multiplying the high frequency components $a'F_2$ by a factor $q_2$, which is dependent upon the envelope of the component $a'F_2$ so as to expand said components $a'F_2$, means for combining the expanded high frequency components with the low frequency components $a'(1-F_2)$ to produce an output signal, the factors $q_1$ and $q_2$ being related at least approximately by the relationship $$q_1=\frac{1}{q_2}=q$$

the cross-over frequency of the responses $F_2$ and $(1-F_2)$ differing relative to that of the responses $F_1$ and $(1-F_1)$ so that the relationship $$F_2=\frac{qF_1}{1+(q-1)F_1}$$

is substantially fulfilled for at least one value of $q$ substantially different from unity.

According to the present invention compression of a signal to be recorded or transmitted is employed for relatively high frequency components independently of lower frequency components. In the case of the lower frequency components there may or may not be compression but if compression is employed for the lower frequency components it is independent of the compression of the relatively high frequency components. After compression the high and low frequency components are combined to form a single signal for recording and transmission. Expansion on reproduction or reception is correspondingly arranged to be a function of the frequency of the sound signal.

In order that the invention may be clearly understood and readily carried into effect, the same will now be more fully described with reference to the accompanying drawings, in which.

Figure 3:
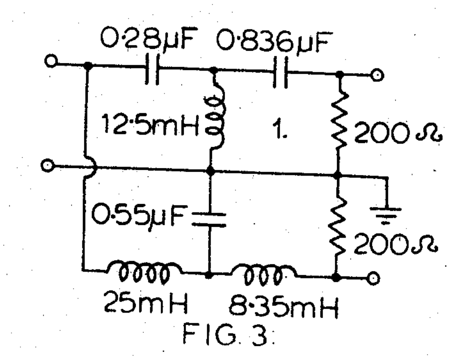
Figure 4:
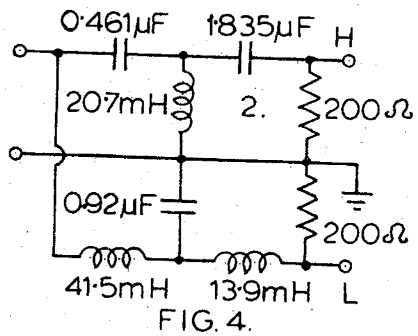
Figure 5:
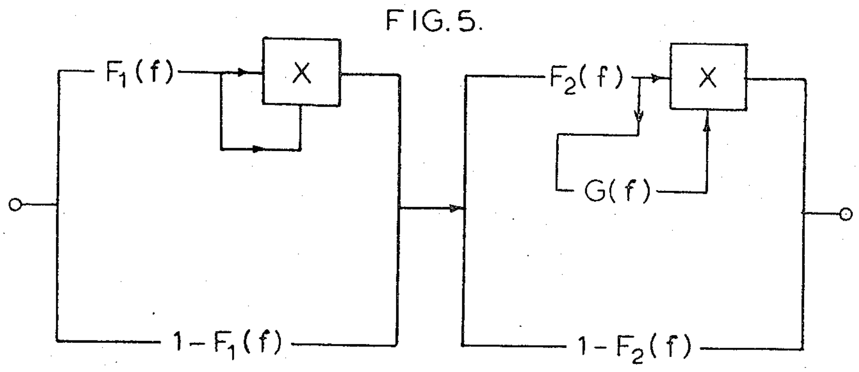
Figure 6:
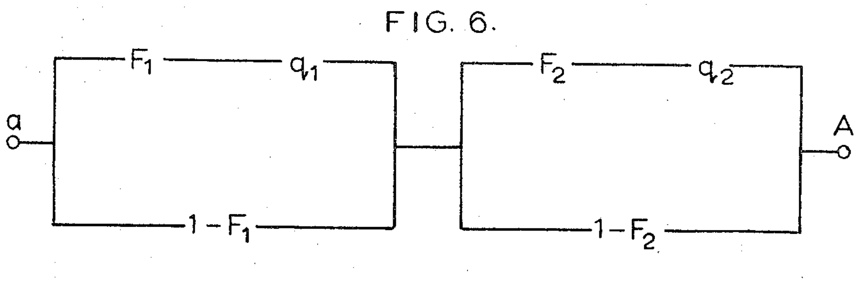
Figure 7:
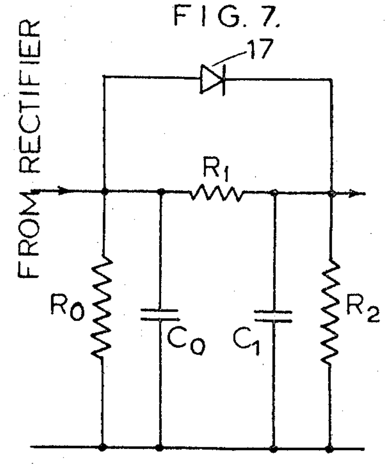
Figure 8:
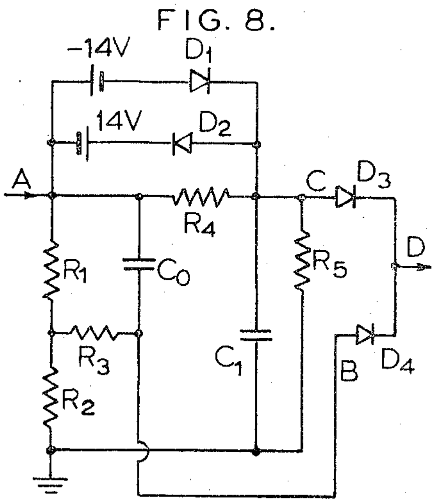
Figure 11:
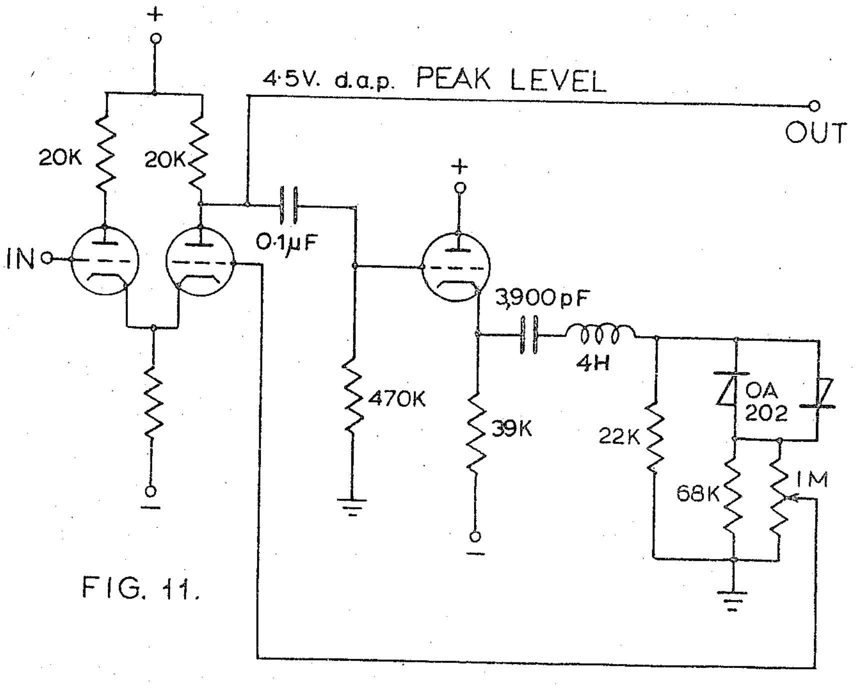
Figure 12:
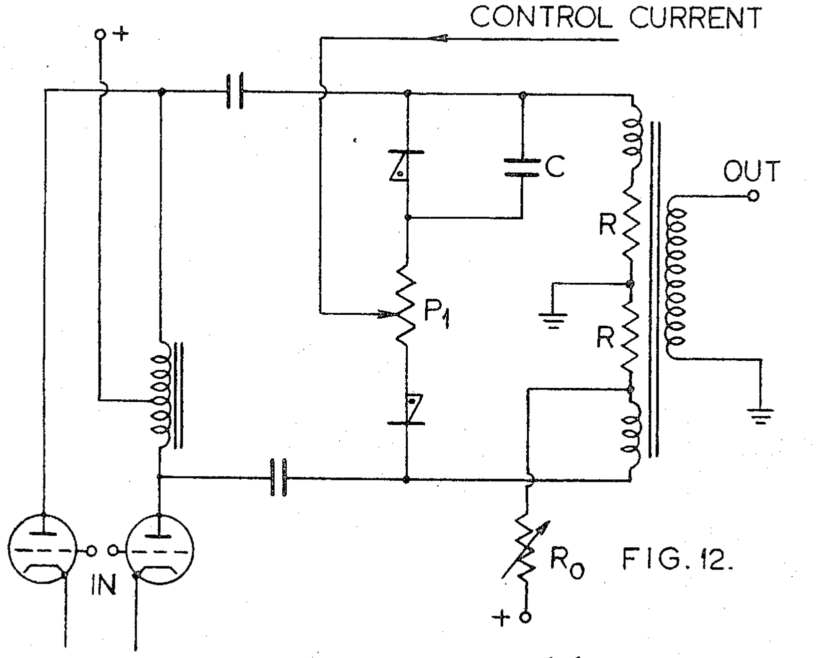
Figure 13:
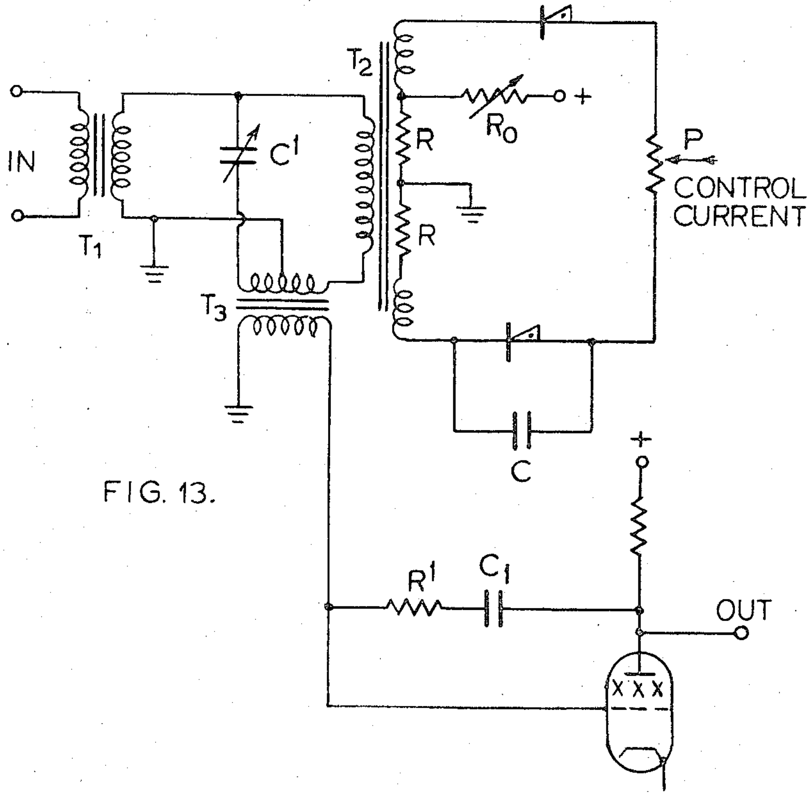

FIGURES 3 and 4 illustrate filters used in the compressor and expander respectively, FIGURES 5 and 6 are functional diagrams of the compressor and expander in tandem, FIGURE 7 illustrates an elongator in the compressor, FIGURE 8 illustrates a non-linear filter in the compressor, FIGURES *9a*, *9b*, *10a* and *10b* are waveform diagrams relating to FIGURE 8, FIGURE 11 illustrates a non-linear filter in the expander, FIGURE 12 illustrates a divider such as could be used in the compressor, and FIGURE 13 is a diagram of a multiplier for use in the expander.

In accordance with the invention compression and expansion are performed on a two-channel system. The use of a two-channel system means that the audio signal in a signal channel must be divided into complementary high and low-frequency channels, one compressor control signal being derived from and applied to the high frequency part of the signal only. In the form of the invention illustrated in the drawings compression (and expansion) is applied only to the high frequency part of the signal. The two channels must then be combined into a single channel before being recorded or transmitted. In the example being described recording of the signal on a magnetic tape is envisaged, the recording being an intermediate step in the process in making gramophone record matrices. On reproduction of the audio signal from the tape record, the channel must be divided again in the expander, the expander control signal being derived from and applied to the high frequency part of the signal only, and the two channels re-combined again at the final output.

In dividing a channel into two frequency bands, it is important to maintain a flat overall frequency response. However, it is not necessary when using audio signals to maintain the correct phase, and the only requirement is to maintain the correct amplitude in the cross-over region, the amplitude being automatically correct outside this region. It is not necessary to maintain either complementary amplitudes or the same phase in the cross-over region, provided that the sum of the relevant vectors produces a flat frequency response. Therefore, in the practical form of the invention illustrated, a so-called Norton filter 1 is used for band division at the compressor and another such filter 2 is used at the expander. The Norton filter has the practical advantage that the sum of the input admittances of the filters is a consant conductance. The filters 1 and 2 are shown in FIGURES 3 and 4, which are marked with suitable component values. It will be seen that a single section filter is used in each case. The response was found to be flat to within 0.2 db, but improved flatness could be obtained by slight modifications to the parameters or the inclusion of phase adjusting networks.

Figure 1:
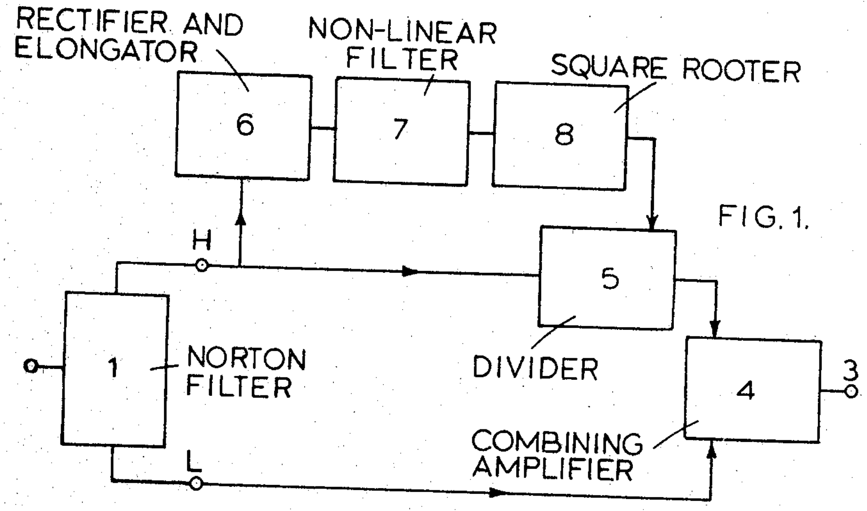
FIGURE 1 is a diagrammatic view of a compressor according to the invention.

Referring now to FIGURE 1, it will be seen that for the compressor, the low frequencies pass through the low-pass portion of the Norton filter straight to the output 3 by way of a combining amplifier 4. On the other hand the high frequencies, after passing through the high-pass portion of the Norton filter 1, are controlled by the divider 5 before reaching the output 3 via the amplifier 4 where they are added to the low frequency part of the signal. Moreover, a portion of the high frequency part of the signal is rectified and elongated in a circuit 6, the elongator of which will be described later. The output of the circuit 6 is passed to a non-linear filter 7 which serves to remove a certain type of distortion as will appear. The output of the filter in turn passes to a function generator 8 which forms the square root of the voltage applied over the range from peak level to 30 db below. The output voltage of the function generator 8 is applied to control the divider 5 so that, if the peak signal applied as an input to the divider is unity and the actual signal is '*a*,' the envelope level of the output of the divider is $a^{1/2}$ from peak level down to $-30$ db, below which the gain of the divider remains constant. In other words, if the signal is $z$ db below its peak value at the input, it will be $x/2$ db below peak level at the output of the divider 5 down to an input level of $-30$ db when it will be $-15$ db at the output and, at still lower levels, will be $(z-15)$ db below its peak level.

Figure 2:
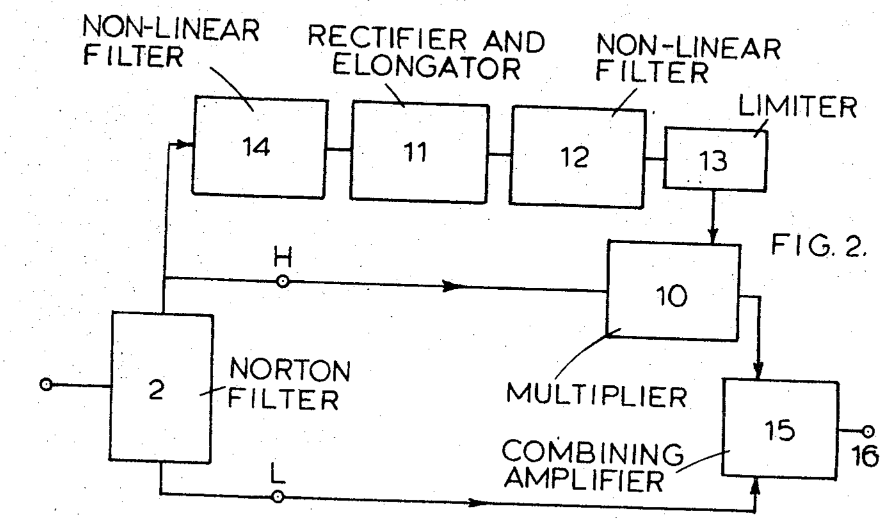
FIGURE 2 is a similar view of the corresponding expander.

The expander circuit shown in FIGURE 2 comprises a multiplier 10 in the high frequency channel, and in the control signal channel there are a rectifying and elongating circuit 11, a non-linear filter 12 and a limiter 13. The input to the control signal channel is taken from the Norton filter 2 via a non-linear by-pass filter 14. Thus, a portion of the high frequency part of the audio signal is passed through the non-linear filter 14 before rectification and elongation. The limiter 13 limits the output of 12 over the range from 0 to $-15$ db, corresponding to 0 to $-30$ db at the original signal input, the limited output being used to control the multiplier 10. Hence, over the range stated, the amplitude of the envelope of the output of the multiplier is proportional to the square of the envelope of the expander input. But the amplitude of the envelope at the expander input is proportional to $a^{1/2}$ so that the amplitude of the envelope at the expander output is proportional to the original signal '*a*' as required. The output of the multiplier 10 is added to the low frequency output of the Norton filter 2 in an amplifier 15, the resultant output appearing at the terminal 16.

The filters 1 and 2 are preferably of the Norton type although any filter or combination of filters having a suitable response may be used. Each filter 1 and 2 may be considered as a combination of a high-pass filter and a low-pass filter.

For the low-pass filter, the amplitude response $F_L$ is given by:

$$F_L=\frac{1}{1+\lambda}\prod_{r=1}^{n}\left(\frac{1}{1+a_r\lambda+\lambda^2}\right) \text{ where } \lambda=jx=j\frac{w}{w_0}$$

$\omega=2\pi f$, $f$ is the frequency variable, $f_0$ is the cross-over frequency of the filters 1 and 2, $n$ is the number of factors of the form $$\left(\frac{1}{1+a_r\lambda+\lambda^2}\right)$$

which are multiplied together to give the filter response, $r$ is any integer from 1 to $n$, and the values for $a_r$ is suitably chosen.

Similarly for the high-pass filter the amplitude response $F_H$ is given by:

$$F_H=\frac{\lambda^m}{1+\lambda}\prod_{r=1}^{n}\left(\frac{1}{1+a_r\lambda+\lambda^2}\right)$$

where $m=2n+1$ so that $F_H(\lambda)=F_L\left(\frac{1}{\lambda}\right)=\lambda^m F_L(\lambda)$ and $F_L+F_H=[1+(jx)^m]F_L$ For $m$ odd $$|F_L+F_H|^2=|F_L|^2+|F_H|^2=(1+x^{2m})|F_L|^2$$

A suitable response for the high-pass and low-pass filters is that known as the Butterworth response, for which $$|F_L|^2=\frac{1}{1+1/x^{2m}} \text{ and } |F_H|^2=\frac{1}{1+1/x^{2m}}$$

whence $$|F_L+F_H|^2=|F_L|^2+|F_H|^2=1$$

Therefore we may write $$|F_H|^2=F_1 \text{ and } |F_L|^2=1-F_1$$

wherein $F_1$ represents the power response function of the high-pass filter.

The Norton filters shown in FIGURES 3 and 4 have the Butterworth response for which $m$, the number of reactances is equal to 3. Any other odd value for $m$ could equally well be used. For even values of $m$ it is necessary to employ similar Butterwork filters in tandem. For two low-pass filters in tandem and two high-pass filters in tandem:

$$|F_L - F_H| = |F_L| + |F_H| = 1$$

and for four similar filters in each case:

$$|F_L + F_H| = |F_L| + |F_H| = 1$$

The following calculations do not apply directly to filters having even values of $m$ but may readily be modified using. $F_H = F_1$ and $F_L = 1 - F_1$.

As stated above Norton filters are used having the Butterworth response, but other types of filter having similar response may be used.

To explain the details of the circuits reference will be made to a simplified diagram shown in FIGURE 5 in which $F_1$ $(f)$ is the high-pass power response of the filter 1 for the compressor and $1-F_1$ $(f)$ is the low-pass response, these responses being power gains. For simplicity all the processing required for the production of the control signal is assumed to be incorporated in a single multiplier unit X. In the expander, $F_2$ $(f)$ is the high-pass power response of the filter 2 while G $(f)$ is the power response of the non-linear filter 14 through which that part of the signal which determines the power gain of the multilier is passed. The low-pass power response of 2 is shown as $1-F_2$ $(f)$. The high and low-pass filter components of each filter 1 or 2 are complementary. A further simplification is shown in FIGURE 6 in which the power gain of the compressor divider 5 is shown as $q_1$ and the power gain of the expander multiplier 10 as $q_2$. The power of the input signal relative to a peak value of unity is denoted by '$a$' and the power of the output signal by A. Ideally as we shall show, $A=a$ and $q_1q_2=1$ while, at peak level, $q_1=q_2=1$ Also $q_1$ varies from unity at peak level to 15 db, or 43 times, for an input signal 30 db or more below peak, while $q_2$ varies from unity at peak level down to $-15$ db, or 0.032, for an input signal 30 db or more below peak.

The output power Pc of the compressor at peak level is given in theory, by the relationship, $$P_c = 1 - F_1 + F_1^{1/2} \qquad (1)$$

which is unity as required for $F_1=0$ and $F_1=1$ and give a maximum error at $F_1=0.25$ where $P_c=1.25$. It would thus appear that the compressor output power $P_c$ at peak level does not satisfy the condition that it should be flat with frequency, but in practice satisfactory results have been achieved. Theoretically more accurate results could be obtained by appropriate adjustments to the Norton filters 1 and 2. In practice the error may be removed by allowing some bass loss in an amplifier, not shown in FIGURE 1, between the divider 5 and the combining amplifier 4.

A second design condition of the example described is that variations in the envolope of one signal component should not vary the envelope of a second signal component i.e. there should be no envelope cross modulation, i.e. that $q_1q_2=1$.

We have $$q_1 = a^{-1/2} F_1^{-1/2} \qquad (2)$$

and $$q_2 = a(1 - F_1 + q_1 F_1)G \qquad (3)$$

where G represents the response function G$(f)$ of the filter 14.

Subsituting for $q_1$ in (3) and multiplying $$q_1q_2 = G[a^{1/2}(F_1^{-1/2} - F_1^{1/2}) + 1] \qquad (4)$$

so that the condition for no cross modulation is that $$1/G = 1 + a^{1/2}(F_1^{-1/2} - F_1^{1/2}) \qquad (5)$$

This equation gives the ideal response characteristic G of the filter 14. Since G varies with the power level '$a$' the filter 14 is as indicated a non-linear filter, which will be described later.

A third condition of the example described is that the frequency response of the compressor and expander in series should be flat at all signal levels. In order to express this condition we shall assume that the previous condition $q_1q_2=1$ has been satisfied. We then have $$A/a = (1 - F_1 + qF_1)(1 - F_2 + F_2/q) \qquad (6)$$

or $$A/a = 1 + (q-1)(F_1 - F_2/q - (1 - 1/q)F_1F_2) = 1 \qquad (7)$$

where $q=q_1=1/q_2$. Hence either $$q=1 \text{ or } F_2 = \frac{qF_1}{1+(q-1)F_1} \qquad (8)$$

It follows that, for frequencies for which $F_1=1$ or 0, $F_2$ must be 1 or 0 respectively. Since both filters are high-pass, these conditions are satisfied automatically. If $F_1$ is assumed given and $F_2$ is assumed to be a Norton filter, the only variable at our disposal is the adjustment of the cross-over frequency of $F_2$. Hence Equation (8) can be satisfied only for one value of $q$. Since Equation (7) is already satisfied for $q=1$ and the highest value of $q$ is 15 db above unity or 32, the filters 1 and 2 were designed to make Equation (8) correct for $q=4$ when $$F_2 = \frac{4F_1}{1+3F_1} \qquad (9)$$

For $F_1=0.5$ we have $F_2=0.8$ so that $F_2$ must have a lower cut-off frequency than $F_1$. For $F_1=0.5$ the error is given by $$A/a - 1 = 0.1\,q - 0.5 + 0.4/q \qquad (10)$$

which give a maximum error of less than 0.5 db. The errors for $F_1=0.25$ and $F_1=0.75$ are less.

It has been shown how the three conditions can be satisfied approximately. Moreover equipment constructed in accordance with the equations given exhibited no audible defect. Nevertheless the residual errors could be further reduced by small empirical adjustments to the various parameters.

It has been shown that the high-pass filter $F_2$ contained in 2 should have a lower cut-off frequency than $F_1$. This means that the cross-over frequency of the Norton filter 1 in the expander should be lower than that of 2 in the compressor. However, too low a cross-over frequency introduces a "hush-hush" effect, while too high a cross-over frequency increases the background noise, and it was found that a reasonable compromise was to make the cross-over frequency 1.9 kc./s. in the compressor and 1.15 kc./s. in the expander. It will be understood that the ratio of the cross-over frequencies is important for a given law of compansion and for a given type of filters, but that the average cross-over frequency is not critical.

Since only high frequencies are rectified in the circuits 6 and 11 a full-wave rectifier is sufficient in each case although, for a lower cross-over frequency, quadrature rectification might be desirable. FIGURE 7 shows the elongator, of the circuit 6, used for removing the audio frequencies and for smoothing after the rectifier in the compressor. The corresponding circuit in the expander is similar, except that $R_2$ is omitted. It has already been pointed out that one of the necessary conditions to be satisfied is that the gain through the compressor and expander in tandem must be independent of frequency and of level. This implies that the shape of a transient at the output must be similar to its shape at the input. If there is any delay in the operation of the compressor on rising transients, the high gain appropriate to low levels will be maintained during the rising portion of the transient with the result that the peak level will be increased above that of the peak level as set for a steady tone. This would cause temporary overload. It is therefore necessary for the full value of the control voltage to operate at the peak level of the sharpest transient likely to be encountered. This can be accomplished either by delaying the audio signal into the compressor divider 5 and using a relatively slowly rising control voltage or, as in the present example, by causing the control voltage to rise in a fraction of a millisecond. The latter method saves the very considerable cost of delay networks and is therefore preferable. The sharp rise is accomplished by means of the diode 17 shown across the resistance $R_1$.

In order to eliminate the audio frequency signals from the output of the rectifier it is necessary to employ some form of low-pass filter. Since, for the reasons given above, it is desirable to allow the envelope to rise rapidly there must inevitably be a limitation on the rate of fall of the envelope. This is no drawback to the operation of the equipment since overload cannot occur on a sharp fall while musical signals seldom decay very rapidly. Nevertheless it is necessary to maintain an appropriate relation between the time constant for a rapidly falling signal in the compressor and in the expander. This relation is determined by the requirement that the condition $q_1q_2=1$ should hold for transients as well as for steady tones. If this condition is not satisfied it has been found that a falling transient of one frequency will vary the envelopes of signals of other frequencies.

Consider first an extreme case in which the main component of the incoming signals falls very rapidly from peak value to zero. Let the falling time constant for the filter following the rectifier in the compressor be $t_0$ and that for the corresponding filter in the expander be $t_1$. Hence the voltage gain of the compressor filter can be written $e^{-t/t_0}$ while that of the expander filter can be written $e^{-t/t_1}$. The effect of the square rooter and of the process of division is to cause the effective gain of the compressor to be $e^{t/2t_0}$. This will cause a modulation of any signal (which may be of smaller amplitude and a different frequency) which accompanies the main signal and is still present when the main component of the signal has fallen to zero. However, this modulation can be completely removed in the expander filter provided that $t_1=2t_0$.

If the law of compression and expansion is different from that described or the operation of the compressor filter is inadequately described by assigning to it a single time constant $t_0$, a different filter will be required in the expander to eliminate the undesired modulation of one signal by the envelope of another. However, the same principle may be applied i.e., that the filters are matched in the sense that the undesired modulation produced by the first is removed by the second.

Referring to the compressor elongator, as shown in FIGURE 7, the time constant $R_0C_0$ is of secondary importance and, for simplicity, will be neglected. If $R_2$ is omitted we have a single time constant $R_1C_1$. Alternatively, if $R_1$ were omitted we should have a single time constant $R_2C_1$. These two time constants are not equivalent as $R_1$ is fed back to the input and $R_2$ is connected to earth. Hence $R_1$ and $R_2$ can be treated as in parallel only in the particular case in which the input signal falls suddenly to zero. If, on the other hand, there is a time constant $t_2$ associated with the fall of the input signal, the discharge through $R_1$ will be slower than it would be if $R_1$ were connected in parallel with $R_2$.

It has been shown that, to obtain correct results for a very sharp fall, the time constant $t_0$ defined by $C_1$, and $R_1$ and $R_2$ in parallel should be $t_1/2$ where $t_1$ is the time constant for the corresponding filter in the expander, in which the resistance corresponding to $R_2$ is omitted. For a slow fall it is required to decrease the effective time constant of the compressor in order to compensate for the slow fall of the input signal by increasing the rate of fall in the compressor filter. This could be accomplished by using $R_2$ and omitting $R_1$. However, this has been found, as would be expected theoretically, to produce an error in the opposite sense. Accordingly, the ratio $R_1/R_2$ is adjusted to give the minimum error, the actual procedure being to minimize the error for an input signal time constant 50 ms. The optimum values were $C=0.02\ \mu F$, $R_1=R_2=1.5$ M giving a time constant on a sharp fall of 15 ms.

The non-linear filter 7 is shown in detail in FIGURE 8. In the absence of this filter, distortion may occur which is most serious for rapid variations, at the rate of 100 c./s. of the envelope of a tone of about 2 kc./s. The distortion appears to be due to the sawtooth waveform which appears at the output of the elongator and contains harmonics of 100 c./s. If these harmonics are not removed from the control voltage they must give rise to additional sidebands of the 2 kc./s. tone.

The filter shown in FIGURE 8 is fed at A with the signal from a low impedance such as the output of a cathode-follower. The input signal is processed in two different ways one part being fed from B through $D_4$ to the output at D and the other being fed from C through $D_3$ to the output. The function of the diodes $D_3$ and $D_4$ is to select the greater of the two outputs at any instant from C and from B respectively.

Consider first the signal at B. On a sharply rising transient the signal passes through the capacitance $C_0$ for about 10 ms. but, when this signal dies away, the residual signal is that derived from the potentiometer $R_1R_2$ and passing through $R_3$. Hence, if the input signal is the unit function represented by A in FIGURE 9(*a*), the output at B is that shown as B in FIGURE 9 (*b*).

Figure 9A:
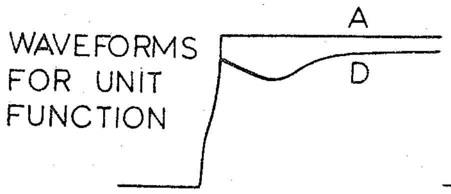
Figure 9B:
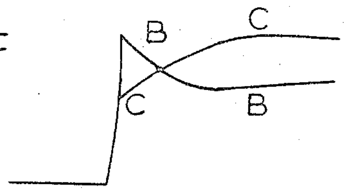

Now consider the signal at C in FIGURE 8. The biased diodes $D_1$ and $D_2$ provide a pair of gates allowing signals to pass through one or other of the diodes only when C is at least 14 v. above or below the potential of A. This means that a sudden rise in voltage will produce no change at C unless and until it exceeds 14 v. nor will a sudden drop in input voltage produce a change at C unless and until it has dropped by 14 v. However, a slower change will be transferred to C via the resistance $R_4=30$ K with a time constant of 6 ms. given approximately by $R_4C_1$, where $C_1=.2\mu F$. It follows that a unit function input will produce an output at C as shown in FIGURE 9(*b*) as the curve C. Under certain conditions, such as the use of a restricted range of input signal values, it has been found experimentally that the omission of the diodes $D_1$ and $D_2$ from the circuit leads to no appreciable deterioration in performance.

The effect of the diodes $D_3$ and $D_4$ is then to select the curve B up to the cross-over point in FIGURE 9(*b*) and curve C thereafter. Hence a unit function produces a gain which rapidly reaches the value appropriate to its peak value and then falls slightly before recovery as shown in FIGURE 9(*a*) at D. The additional resistance $R_5=1$ M was found desirable to ensure that the initial value was only slightly greater than the final value of the resultant curve for the output signal at D. The correct adjustment of this initial value can be used to minimize the effect of the subsequent droop in the response.

Figure 10A:
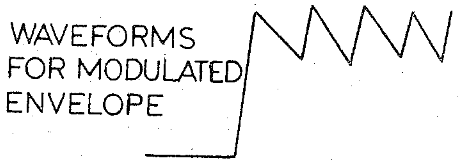
Figure 10B:
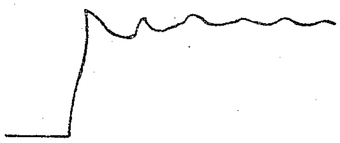

The effect of a sawtooth input, as produced by beats, is shown in FIGURE 10(*a*). The rapid initial rise is due to $C_0$. The output then falls as in the first part of the curve B in FIGURE 9(*b*). The subsequent sawtooth variation is prevented, except for a cycle or so, by the gate action of the diodes $D_1$ and $D_2$ which leaves $R_4$ as the only path from A to C in FIGURE 8. Hence the sawtooth variation is smoothed, both on the rise and the fall, by the time constant $R_4C_1$ which is adequate for the purpose. Nevertheless there is a residual ripple as shown in FIGURE 10(*b*) which is, however, almost entirely free of the harmonics of 100 c./s. which originally caused distortion.

The circuit of the filter 12 employed in the expander is similar to that shown in FIGURE 8, except for minor modifications to the component values made to optimize the overall result.

The function generator 8 in FIGURE 1 extracts the square root of the applied voltage over the range from 0 db to 30 db below the peak level. The db range is thereby halved over this range of levels, while the level of all signals which are initially more than 30 db below peak is increased by 15 db. The output voltage from the function generator 8 controls the gain of the divider 5 thereby taking the square root of the envelope of the signal amplitude as applied to the divider. The function generator 8 is designed according to known principles, and may comprise, for example a diode function generator.

In the expander (FIGURE 2) the output of the limiter circuit 13 is applied directly to the multiplier 10 so that the amplitude of the envelope of the output is proportional to the square of the amplitude of the envelope of the compressed signal and is hence proportional to the amplitude of the envlope of the original input signal.

The filter 14 in the expander is shown in detail in FIGURE 11. It will be convenient to define the response G as that of the filter 14 together with that of the high pass portion of the filter 2 which by itself has the response $F_2$. The object of filter 14 is to ensure that variations in the envelope of one component signal should not vary the envelope of a second component signal. Referring to equation (5), we note that we should have $G=1$ when $F=1$ and $G=0$ when $F=0$. Since $F_2$ is a high-pass filter this presents no difficulty. In the cross-over region G is made approximately correct for all frequencies at peak input when $a=1$. The response for G is then given approximately by the following table.

| $F_1^{1/2}$ | $G^{1/2}$ |
|---|---|
| 0.16 | 0.32 |
| 0.25 | 0.40 |
| 0.5 | 0.58 |
| 0.81 | 0.83 |

Hence the cut-off for G should be lower than for $F_1$ and the cut-off should be slower. However, equation (5) shows that, as the amplitude of the input signal decreases, the response at low frequencies should increase and ultimately the response of G should approach a flat response as '*a*' approaches zero. On the other hand as the frequency decreases a greater proportion of the signal is diverted through the low-pass portion of the Norton filter 2 in the expander so that the importance of the error in G becomes less and less. Hence we have the situation in which G is correct at the higher frequencies and also at amplitudes near the peak amplitude and can produce errors only at low levels and intermediate frequencies. Such errors are partially corrected by introducing a boost at intermediate frequencies and low signal amplitudes.

Referring to FIGURE 11, the input to the filter is applied to the grid of one valve of a long-tail pair and the output is derived from the anode of the other valve of the pair, negative feedback being provided by means of a third valve connected between the anode and grid of the other valve of the pair. The third valve is arranged as a cathode follower and feeds a series tuned circuit resonant at 1270 c./s., so that the negative feedback is most effective at this frequency. A pair of diodes connected in parallel, but in opposite sense, transmit the signal passed by the series tuned circuit to the grid of the other valve of the long-tail pair, so that the negative feedback is more effective for high level signals for which the diodes are conductive over a greater fraction of each cycle so that the mean resistances of the diodes are small. Hence as the level rises, the effective cut-off frequency increases, the shape of the response of the filter varying in the required manner.

The object of the filter 14 is to reduce cross-modulation of the envelope of one component signal by the envelope of another component signal in the same channel, otherwise changes in amplitude of a 2 kc./s. signal component, for example will change the amplitude of what should be a steady 10 kc./s. signal. In practice, with the filter shown in FIGURE 11, the residual cross-modulation is inaudible. The response of the filter 14 as given in Equation (5) is correct only for the particular law of compansion chosen for the example of the invention shown. The changes in the Equations (2) to (5) required to maintain the condition $q_1q_2=1$ for different laws of compansion will be evident to anyone skilled in the art.

A suitable circuit arrangement for the divider 5 is shown in FIGURE 12. The audio signal from the high-pass output of the Norton filter 1 is applied in push-pull to the grids of the triodes, and appears in push-pull across the series arrangement of the two zener diodes and the potentiometer $P_1$, and across the primary windings of the transformer. The output signal is taken from the secondary winding of the transformer. The control current, which represents the division, is derived from the function generator 8 and applied to the wiper of potentiometer $P_1$.

A suitable circuit arangement for the multiplier 10 is shown in FIGURE 13. The audio input from the Norton filter 2 is applied to the primary winding of transformer $T_1$. A control current representing the multiplier and derived from the limiter 13 is applied to the wiper of the potentiometer P which is connected at each end via a Zener diode to a secondary winding of transformer $T_2$. The secondary winding of transformer $T_1$ and the primary winding of transformer $T_2$ are connected in series across half of the primary winding of transformer $T_3$. The primary winding of transformer $T_2$ is connected across the primary winding of transformer $T_3$ by condenser $C^1$. The output signal of the multiplier is taken from the secondary winding of transformer $T_3$ after amplification in the tube shown. Negative feedback is provided over the tube by $C_1R^1$ to provide a low output resistance with a high signal-to-noise ratio.

The circuits of the divider and multiplier are complementary and their operation is based on the exponential characteristic of the Zener diodes. The basic theory of the operation of the divider and multiplier circuits is described in the specification of co-pending British patent application No. 1926/63.

In the divider, the input audio voltage is set up across the diodes in series, and the slope resistances of the diodes are inversely proportional to the control current, with the result that the audio current flowing in the primary winding of the transformer is inversely proportional to the magnitude of the control current. Thus the output signal developed in the secondary winding of the transformer is proportional to the input signal applied in push-pull across the diodes divided by the magnitude of the control current from the function generator 8.

In the multiplier, the impedances of the diodes appear across the primary of the transformer $T_2$, thus attenuating the signal transfer from the secondary winding of the transformer $T_1$ to the primary windings of the transformer $T_3$. The condenser $C^1$ is adjusted to provide zero coupling at high frequencies for zero control current. As in the divider, the diode impedances are inversely proportional to the control current, but in this case they appear in series with the signal, so that the net result is a multiplication of the input signal by the control current from the limiter 13.

In the divider, resistive balance is adjusted by potentiometer $P_1$, voltage balance by $R_0$, and capacitive balance by C. In the multiplier, P provides the resistive balance, $R_0$ the voltage balance, and C the capacitive balance.

The divider 5 and multiplier 10 may both be multipliers, for example, Hall effect multipliers, in which case the function generator 8 must be arranged to generate the inverse of the square root of the signal applied to it.

In the example of the invention described above, compression is achieved by changing the amplitude of the envelope of the applied signal to its square root, and expansion by squaring the amplitude of the envelope of the compressed signal. Although other laws, such as cubic or logarithmic may be used for compression and corresponding inverse laws for expansion, the use of a quadratic law as in the example given has the advantage that no function generator is needed to produce the control signal for the multiplier in the expander.

Although in the example of the invention described, recording on magnetic tape is envisaged, the invention could be applied, with obvious modifications to the parameters, to improving signal-to-noise in cases other than tape e.g., radio, lines, sound-film etc., provided the signal-to-noise spectrum was flat or rose with frequency. The invention is also applicable to stereophonic recording or transmission.

The invention moreover has broader applications than compression and expansion and is applicable, in general, to the control of the envelope level of an audio signal at high speed without introducing distortion or other undesired effects, particularly when it is sufficient to control the level of the higher frequencies. Thus it should be applicable to simple compression of the higher levels which, otherwise, might run into overload conditions.

The non-linear circuit shown in FIGURE 8 may also have applications other than to compression and expansion or to the control of audio frequency signals. It provides a form of non-linear smoothing in which the smoothing produced by $R_4C_1$ is applied only to variations of implitude which are a fraction of the maximum amplitude of the signal, but is applied both when the signal is rising and when it is falling. The time of rise of the transient is not reduced by the smoothing, and except for a low-level tail, the time of fall is not affected by the smoothing. By way of example the circuit could be applied in a feedback path whereby rapid-acting feedback is obtained and yet oscillatory variations of relatively small amplitude are suppressed and hence cannot build up to produce permanent oscillation.

In the example of the invention described two channels are used, so that it would be possible to employ independent compression and expansion for the low and high frequencies. Nevertheless the noise from the tape entering the low-frequency channel in the expander has been found to be sufficiently weak, owing to the narrower bandwidth and the reduced sensitivity of the ear for low frequencies, to make this inessential. Ideally several channels could be used each independently controlled.

As in the example described there is no danger of overloading the tape on sharp transients no delay networks are necessary, nor is it required to limit compression and expansion to several db below peak level. Indeed it may be advantageous to compress and expand even above peak level.

In recording on tape it is standard practice to incorporate an equalizer before the recording head, the frequency response of the equalizer being intended to maximize the audible signal-to-noise ratio for a given small amount of occasional audible distortion due to overloading. It will be appreciated that equalization before recording implies appropriate equalization after replay in order that the overall characteristic shall be flat. A particular recording characteristic is known is the C.C.I.R. recording characteristic but other recording characteristics may be more appropriate in some cases.

The optimum characteristic is determined by such factors as the probability, expressed as a function of frequency, of the spectrum level exceeding a specified level, the variation of the audible overload level, e.g., of tape, with frequency and the variation of the audibilty of noise with frequency. The discussion will be simplified by considering only the first two factors in relation to tape although it will be realized that the invention applies to any system of recording or transmission in which the same principles can be applied. Equalization characteristics will be assumed to refer only to the factors under discussion and not to any equalization required to correct for the special characteristics of the associated equipment such as the $\omega$-response of the replay head.

If the audible overload characteristic of the tape were flat with frequency it would be possible to consider only the variation of spectrum level of the incoming signal. In practice this must be considered statistically. Nevertheless it is generally agreed that the spectrum level falls with frequency. Hence, if the probability of audible overload of the tape is to be the same over the frequency band, the recording characteristic should rise with frequency. Let the rise be $r_1$ db where $r_1$ is a function of frequency.

If, on the other hand, the spectrum level at the input were flat and the audible overload level for the tape fell with frequency, it would be necessary to employe a falling record characteristic the fall being, say, $r_2$ db where $r_2$ is a function of frequency. If both factors are included the equalizing characteristic can be represented by $r_1 - r_2$ db rises with frequency. It will be understood that the estimation of both $r_1$ and $r_2$ involves subjective factors, while some modification might be necessary to allow for the variation of audible noise with frequency.

A feature of the present invention relates to the application of these principles to cases in which compansion is employed.

According to this feature of the invention two equalizers are provided one before compression and the other after compression but before the process of recording, such that the tape is fully loaded over the frequency band for a given permissible degree of occasional audible overload distortion and the operating point on the non-linear network employed for producing the appropriate compression control voltage is the same at all frequencies for a signal which fully loads the tape as defined.

The two conditions expressed in the preceding paragraph are independent in the mathematical sense, and the adjustments of the responses of the two equalizers provide two independent variables for each frequency with the aid of which the two conditions can be satisfied.

This feature of the invention is not confined in its application to compression and expansion equipment such as illustrated but it will be explained in relation to such equipment.

Let 0 db be the 2% distortion level at the compressor. If the probability is to be the same for all frequencies, the equalizer before the compressor must give a rise of $r_1$ db. Also, to allow for fall in overload level on the tape with frequency, there must be an equalizer between the compressor and the tape giving a fall of $r_2$ db with frequency. Moreover to restore the original signal at the final output there must be an equalizer giving a rise of $r_2$ db between the tape and the expander and an equalizer giving a fall of $r_1$ db between the expander and the final output.

However, it may be that, to allow for variations of noise level with frequency, or for other reasons it is decided to change $r_1$ to $r_3$ and $r_2$ to $r_4$ in the compressor. In this case similar changes must be made in the expander.

The main characteristic of the feature of the invention under consideration is the use of four equalizers in the positions described whereby optimum loading over the frequency band is obtained both for the tape and for the non-linear network which determines the law of compression.

Let the law of the non-linear network be such that it is linear for input signal levels more than 30 db below peak, but halves the deviation in db from the peak level whether this deviation is above or below peak. This implies that the non-linear range of the linear network extends from $-30$ db to $r_x$ db with respect to peak level as 0 db, where $r_x$ is not less than the highest signal level likely to be encountered.

Since peak level is made the same at the tape whether compansion is employed or not, it follows that there is no compression and no expansion at peak levxel. Below peak level the signal-to-noise level is improved, as explained, while for the occasional signals which exceed peak level, the distortion due to overload is reduced. Thus suppose the input signal exceeds peak level by 6 db and that, with no compression, the tape characteristic is such that this is reduced to 3 db at the output from the tape while, with a compression from 6 db to 3 db in the compressor, the tape further compresses the signal to, say 2 db (which is reasonable) so that the expander raises this to 5 db, the distortion is then reduced from an amount represented by 3 db to an amount represented by 1 db.

What we claim is:

1. In a sound recording or signal transmission system, apparatus comprising first filter means for separating the components of an initial signal into first low and high frequency bands, means for compressing the components in one of said bands to a greater degree than the components in the other band, means for combining the components in said one band after compression with the components in said other band to produce an intermediate signal, means for receiving said intermediate signal after transfer liable to contribute noise to said intermediate signals, second filter means for separating the components of the intermediate signal received by said receiving means into second high and low frequency bands, means for expanding components in said second frequency bands to a degree related to the compression of corresponding components in said first frequency bands, and means for combining the components in said second bands after expansion to produce an output signal substantially corresponding to said input signal, the cross-over frequency of said second low and high frequency bands differing from the cross-over frequency of said first low and high frequency bands produce a substantially flat overall amplitude response throughout the cross-over region of said filter means for at least one substantial value of relative compression and corresponding subsequent expansion of said one band relative to said other band.

2. A system according to claim 1 comprising a signal transmission channel for transferring said intermediate signal to said receiving means.

3. A system according to claim 1 comprising a signal recording and reproducing means for transferring said intermediate signal to said receiving means.

4. A system according to claim 1 in which said compressing means is arranged to compress only the components in said first high frequency band and said expansion means is arranged to expand only the components in said second high frequency band, said second cross-over frequency being lower than said first cross-over frequency.

5. A system according to claim 4 wherein said first filter means comprise a low pass filter and a high pass filter having complementary amplitude responses and said second filter means comprise a low pass filter and high pass filter having complementary amplitude responses.

6. A system according to claim 4 wherein said first filter means comprise a low pass filter and a high pass filter having complementary power responses and said second filter means comprise a low pass filter and high pass filter having complementary power responses.

7. A system according to claim 6 wherein said first cross-over frequency is about 1.9 kc./s. and the second cross-over frequency is 1.15 kc./s.

8. Apparatus according to claim 4 in which said compression means produces a compression of the components in the first high frequency band dependent upon the envelope of the components in said band and in which said expansion means produces an expansion of the components in said second high frequency band dependent upon the envelope of a signal non-linearly related to the components in said second high frequency band, the non-linearity being such that the product of said two envelopes is more nearly constant for frequencies in the cross-over range of said bands than would be the case in the absence of said non-linear relationship.

9. Apparatus according to claim 8 in which said non-linearly related signal is non-linearly dependent upon frequency and is also non-linearly dependent upon power level.

10. Apparatus according to claim 8 which comprises means for deriving a signal from the components in said first high frequency band, means for rectifying said signal, and deriving means for smoothing the rectified signal so as to derive a control signal having a rapid maximum rate of rise and a slower maximum rate of fall, the compression of the components in said high frequency band being dependent upon said control signal.

11. Apparatus according to claim 10 including means for smoothing repetitive rapid variations of small amplitude in the envelope signal without substantially smoothing similar variations of larger amplitude.

12. Apparatus according to claim 10 which comprises means for deriving a signal from the components in said second high frequency band, means for rectifying said signal and, deriving means for so smoothing the rectified signal as to derive a second control signal having a rapid maximum rate of rise and a slower maximum rate of fall, the expansion of the components in said second high frequency band being dependent upon said second control signal.

13. Apparatus according to claim 12 including means for smoothing repetitive rapid variations of small amplitude in said second control signal without substantially smoothing similar rapid variations of large amplitude.

14. Apparatus according to claim 12 in which the maximum rate of fall of the second control signal is more rapid than the maximum rate of fall of the first control signal.

15. A system according to claim 4 in which said compressing means comprises a gain controlled circuit to which the components in said first high frequency band are applied, and means for controlling the gain of said circuit in dependence upon the envelope of said components in said first high frequency band.

16. A system according to claim 15 comprising a rectifier connected to receive components in said first high frequency band, and a filter for smoothing the output of said rectifier said filter having different time constants effective on rising and falling signals respectively to produce from the output of said rectifier a first control signal having a rapid maximum rate of rise and a slower maximum rate of fall, said first control signal being effective to control the gain of said gain controlled circuit.

17. A system according to claim 16 comprising a further filter for smoothing repetitive rapid variations of small amplitude in said first control signal without substantially smoothing similar variations of larger amplitude.

18. A system according to claim 15 in which said expanding means comprises a gain controlled circuit to which components in said second high frequency band are applied and means for controlling the gain of said circuit in dependence upon the envelope of a signal non-linearly related to the components in said second high frequency band.

19. A system according to claim 18 comprising a filter to which components in said second high frequency band are applied, said filter having a response which is non-linearly dependent upon frequency and upon power level to produce said signal non-linearly related to the components in the second high frequency band.

20. A system according to claim 19 comprising a rectifier for said non-linearly related signal, and a filter having different time constants effective on rising and falling signals for smoothing the output of said rectifier to derive a second control signal having a rapid maximum rate of rise and a slower maximum rate of fall, said second control signal being effective to control the gain of the gain controlled circuit in said expanding means.

21. A system according to claim 20 in which said time constant for falling signals is longer than the time constant for falling signals of the respective filter in the compressing means.

22. In a sound recording or signal transmission system, apparatus comprising a source of initial electric signal *a*, first filter means for separating said signal into low and high frequency components substantially represented by $a(1-F_1)$ and $aF_1$ respectively, where $F_1$ is a high pass filter response, compression means for multiplying the components $aF_1$ by a factor $q_1$ which is dependent upon the envelope of the component $aF_1$ so as to compress said components $aF_1$, means for combining the low frequency component with said compressed high frequency components to produce an intermediate signal $a'$ represented by $a(1-F_1+q_1F_1)$, means for receiving said intermediate signal after transfer liable to contribute noise to said intermediate signal, second filter means for separating the signal $a'$ received by said receiving means into low and high frequency components substantially represented by $a'(1-F_2)$ and $a'F_2$ respectively, where $F_2$ is a second high pass filter response having a lower cut-off frequency than the response $F_1$, expansion means for multiplying the high frequency components $a'F_2$ by a factor $q_2$, which is dependent upon the envelope of the component $a'F_2$ so as to expand said components $a'F_2$, means for combining the expanded high frequency components with the low frequency components $a'(1-F_2)$ to produce an output signal, the factors $q_1$ and $q_2$ being related at least approximately by the relationships $$q_1=\frac{1}{q_2}=q$$

the cross-over frequency of the responses $F_2$ and $(1-F_2)$ differing relative to that of the responses $F_1$ and $(1-F_1)$ so that the relationship $$F_2=\frac{qF_1}{1+(q-1)F_1}$$

is substantially fulfilled for at least one value of $q$ substantially different from unity.

23. Apparatus according to claim 22 in which there is provided means for making a sound record of said intermediate signal and said means for receiving said intermediate signal comprises sound record transducing means.

24. Apparatus according to claim 22 in which $F_1$ and $F_2$ represent power/frequency responses.

25. Apparatus according to claim 22 in which $F_1$ and $F_2$ represent amplitude/frequency response.

26. Apparatus according to claim 22 in which the cross-over frequency of the response $(1-F_1)$ and $F_1$ is about 1.9 kc./s. and the cross-over frequency of the responses $(1-F_2)$ and $F_2$ is about 1.15 kc./s.

27. Apparatus according to any of claim 22 in which $q_1$ approximates the reciprocal of the square root of the envelope of $aF_1$, $a$ representing the power or amplitude of the initial audio signal, as a ratio of the peak power or peak amplitude as the case may be.

28. Apparatus according to claim 22 in which non-linear control means are provided to make $q_2$ dependent upon the envelope of a signal non-linearly related to the components $a'F_2$, the non-linear relationship being such as to cause the product $q_1q_2$ to approximate more nearly to a constant for all frequencies at which $F_1$ is greater than zero than would be the case in the absence of said non-linear relationship.

29. Apparatus according to claim 28 in which said non-linearly related signal is non-linearly dependent upon frequency and also non-linearly dependent upon power level.

References Cited

UNITED STATES PATENTS

| | | | |
|---|---|---|---|
| 2,948,860 | 8/1960 | Affelder | 333—14 |
| 3,067,291 | 12/1962 | Lewinter | 333—14 |
| 3,207,854 | 9/1965 | Johnson | 179—100.2 |

OTHER REFERENCES

F. Langford-Smith: "Radiotron Designer's Handbook"; 4th Edition; Wireless Press; Sydney, Australia; RCA Victor; Harrison, New Jersey, 1953; page 185; FIGURE 4.53.

BERNARD KONICK, *Primary Examiner.*

L. G. KURLAND, *Assistant Examiner.*